US011428202B2

United States Patent
Ejlersen et al.

(10) Patent No.: US 11,428,202 B2
(45) Date of Patent: Aug. 30, 2022

(54) WIND TURBINE BLADE PROVIDED WITH ROOT END FLANGE

(71) Applicant: LM WP PATENT HOLDING A/S, Kolding (DK)

(72) Inventors: Flemming Ejlersen, Vejle (DK); René Van Den Berg, Heerhugowaard (DK); David Roberts, Amsterdam (NL); Eddy Keesmekers, Enkhuizen (NL)

(73) Assignee: LM WP PATENT HOLDING A/S, Kolding (DK)

( * ) Notice: Subject to any disclaimer, the term of this patent is extended or adjusted under 35 U.S.C. 154(b) by 1086 days.

(21) Appl. No.: 15/751,009

(22) PCT Filed: Aug. 12, 2016

(86) PCT No.: PCT/EP2016/069294
§ 371 (c)(1),
(2) Date: Feb. 7, 2018

(87) PCT Pub. No.: WO2017/025640
PCT Pub. Date: Feb. 16, 2017

(65) Prior Publication Data
US 2018/0230965 A1 Aug. 16, 2018

(30) Foreign Application Priority Data
Aug. 13, 2015 (EP) .................................. 15180938

(51) Int. Cl.
*F03D 1/06* (2006.01)
*F03D 7/02* (2006.01)
(Continued)

(52) U.S. Cl.
CPC ......... *F03D 1/0658* (2013.01); *F03D 1/0633* (2013.01); *F03D 1/0675* (2013.01);
(Continued)

(58) Field of Classification Search
CPC .... F03D 1/0633; F03D 1/0658; F03D 1/0675; F03D 7/022; F03D 7/0224; F03D 7/024; F03D 17/00; F03D 80/70
See application file for complete search history.

(56) References Cited

U.S. PATENT DOCUMENTS

| 3,166,363 | A  | * | 1/1965 | Pitfield | ................. | F16C 23/084 |
|           |    |   |        |          |                   | 384/570 |
| 8,003,582 | B2 | * | 8/2011 | Mikami   | .................. | B61F 17/30 |
|           |    |   |        |          |                   | 508/165 |

(Continued)

FOREIGN PATENT DOCUMENTS

| DE | 102004017323 A1 | 11/2005 |
| DE | 202007008066 U1 | 11/2008 |

(Continued)

OTHER PUBLICATIONS

International Search Report dated Oct. 28, 2016 issued in corresponding International Application No. PCT/EP2016/069294.
(Continued)

*Primary Examiner* — Topaz L. Elliott
*Assistant Examiner* — Aye S Htay
(74) *Attorney, Agent, or Firm* — Nath, Goldberg & Meyer; Jerald L. Meyer; Tanya E. Harkins

(57) ABSTRACT

A wind turbine blade (10) for a horizontal axis wind turbine (2), wherein the wind turbine blade (10) extends in a longitudinal direction parallel to a longitudinal axis and having a tip end (14) and a root end (16), and wherein the wind turbine blade (2) further includes a shell body is disclosed. The wind turbine blade (10) further includes a root end flange (55, 155, 255) at the root end (16) of the blade (10) and which includes a ring-shaped body that extends circumferentially along the entire root end (16), the root end flange (55, 155, 255) preferably made from a metal, such as stainless steel. The root end flange (55, 155, 255)

(Continued)

includes an inwardly extending protrusion (70, 170) with a distal plate part (72, 172, 272, 372, 472, 572, 672, 772) arranged in a distance from the ring body.

19 Claims, 7 Drawing Sheets

(51) Int. Cl.
*F03D 17/00* (2016.01)
*F03D 80/70* (2016.01)

(52) U.S. Cl.
CPC ........... *F03D 7/0224* (2013.01); *F03D 17/00* (2016.05); *F03D 80/70* (2016.05); *Y02E 10/72* (2013.01)

(56) References Cited

U.S. PATENT DOCUMENTS

| | | | |
|---|---|---|---|
| 2004/0165987 A1 | 8/2004 | Wobben | |
| 2008/0213095 A1* | 9/2008 | Bech | F16C 27/04 416/131 |
| 2010/0171317 A1* | 7/2010 | Trede | F16B 2/005 290/55 |
| 2013/0177419 A1* | 7/2013 | Zaehr | F03D 7/0224 416/23 |
| 2013/0177423 A1* | 7/2013 | Pasquet | F03D 7/0224 416/153 |
| 2013/0216394 A1 | 8/2013 | Leonard | |
| 2014/0377069 A1* | 12/2014 | Minadeo | F16C 33/586 416/135 |
| 2015/0003986 A1* | 1/2015 | Minadeo | F16C 35/042 416/131 |
| 2016/0010625 A1* | 1/2016 | Canedo Pardo | F03D 1/0658 416/131 |
| 2016/0348647 A1* | 12/2016 | Ebbesen | F03D 1/0658 |

FOREIGN PATENT DOCUMENTS

| | | |
|---|---|---|
| EP | 1959129 A2 | 8/2008 |
| EP | 2431606 A1 | 3/2012 |
| EP | 2511522 A1 | 10/2012 |
| EP | 2886858 A1 | 6/2015 |

OTHER PUBLICATIONS

Office Action dated Nov. 11, 2019 issued in corresponding European Application No. 16750858.9.
Communication Pursuant to Article 94(3) EPC dated Mar. 26, 2021 corresponding to European application No. 16750858.9-1007.

* cited by examiner

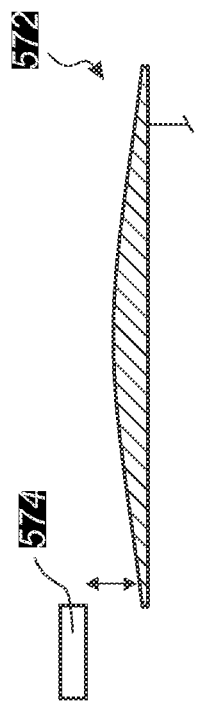 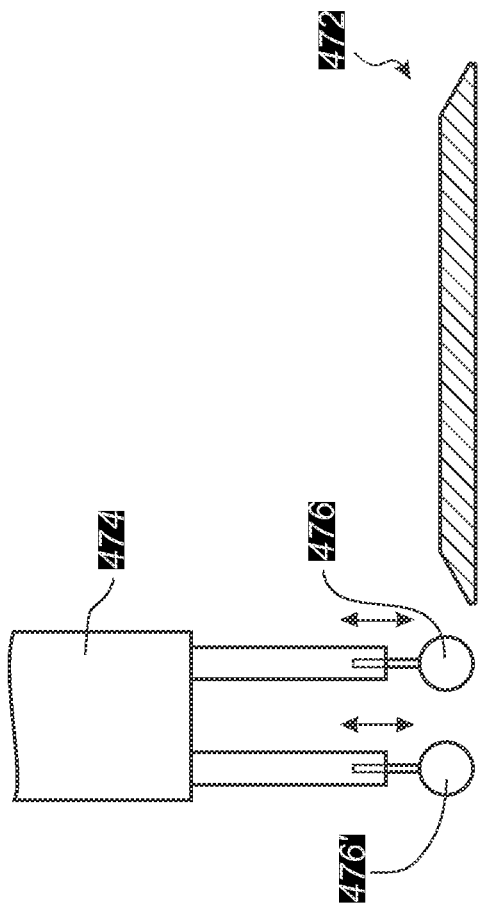  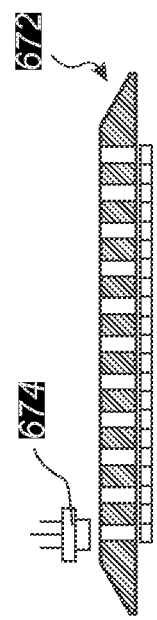
Fig. 8
Fig. 9
Fig. 10
Fig. 11

WIND TURBINE BLADE PROVIDED WITH ROOT END FLANGE

This is a National Phase Application filed under 35 U.S.C. 371 as a national stage of PCT/EP2016/069294, filed Aug. 12, 2016, an application claiming the benefit of European Application No. 15180938.1, filed Aug. 13, 2015, the content of each of which is hereby incorporated by reference in its entirety.

TECHNICAL FIELD

The present invention relates to a wind turbine blade provided with a root end flange. The invention also relates to a wind turbine blade pitch system and a wind turbine with such a wind turbine blade.

BACKGROUND ART

Modern wind turbines, also called wind motors, wind engines, or wind power plants, are employed to produce electricity. They are often very large structures with blades having a length of more than 40 metres, and which are made from fibre-reinforced polymer shells. Today, the blades may even have a length of more than 80 metres.

The wind turbines are often provided as so-called horizontal axis wind turbine or HAWTs. Such wind turbines comprise a machine housing on top of a tower and a rotor with a hub and a number of wind turbine blades, preferably two or three, mounted on a substantially horizontal rotor shaft.

Modern wind turbines are often provided with a pitch system to pitch the wind turbine blades to actively change the angle of attack of airflow over the blades. This is preferred over stall-regulated wind turbines as the pitching enables far greater control of the power output from the wind turbine. Further, the pitching may be utilised to change deflection of the blades, whereby collisions between blade tips and the tower may be avoided.

Pitch system may require a pitch limiter or means for calibrating the pitch system in order to ensure optimum functionality of the pitching system.

US 20103/0216394 A1 discloses a horizontal axis wind turbine with wind turbine blades. The blade comprises a root end flange. Further, the wind turbine is provided with an adaptor, which is provided between a root end of the blade and a bearing ring of the wind turbine. The adaptor allows the root end to have a smaller diameter than a pitch bearing. The adaptor may be provided in form of a plate member, which provides a continuous mounting surface.

SUMMARY OF THE INVENTION

It is an object of the invention to obtain a new wind turbine blade, which overcome or ameliorate at least one of the disadvantages of the prior art or which provide a useful alternative.

This is according to the invention obtained by a wind turbine blade for a horizontal axis wind turbine, wherein the wind turbine blade extends in a longitudinal direction parallel to a longitudinal axis and having a tip end and a root end, and wherein the wind turbine blade further comprises a shell body, and wherein the wind turbine blade further comprises a root end flange at the root end of the blade, the root end flange comprising a ring-shaped body that extends circumferentially along the entire root end, the root end flange preferably made from a metal, such as stainless steel or hot-dip galvanised steel, wherein the root end flange comprises an inwardly extending protrusion with a distal plate part arranged in a distance from the ring body.

The inwardly extending protrusion extends from the ring-shaped body of the root end flange. The inwardly extending protrusion and distal plate part may thus be utilised as a pitch-position indicator, which in turn can be utilised as a pitch angle limiter or a pitch angle indicator for calibration purposes. Accordingly, they may be utilised to optimise the pitch system of the wind turbine.

The shell body preferably has a profiled contour or aerodynamic surface including a pressure side and a suction side, as well as a leading edge and a trailing edge with a chord having a chord length extending there between, the profiled contour when being impacted by an incident airflow generating a lift.

In a preferred embodiment, the root end flange provides an interface between the root end of the wind turbine blade and a pitch flange provided in a hub of a wind turbine.

In an advantageous embodiment, the root end flange is divided into a plurality of connected root end flange segments. Accordingly, the inwardly extending protrusion and the distal plate part may be provided in one segment, whereas the remainder of the ring-shaped body may be provided as one or more separate segments. Accordingly, the protrusion and plate may more easily be adapted to a particular blade type without having to redesign the entire root end flange.

The root end flange segments may advantageously be interconnected via a mating connection.

In another advantageous embodiment, the inwardly extending protrusion and the distal plate part are integrally formed. Alternatively, the inwardly extending protrusion and the distal plate part may be provided as two or more connected parts.

In principle, the root end flange may comprise a plurality of inwardly extending protrusions and a distal plate parts, e.g. as two pitch limiter devices.

In one embodiment, the distal plate part comprises a taper section at a circumferential end of the distal plate part, advantageously at both circumferential ends of the distal plate part art. The taper section may be adapted to interact with a contact part of a pitch system, the contact part for instance being connected to the hub of the wind turbine.

The taper section may have a taper angle in the interval from 10 to 60 degrees, advantageously in the interval 15 to 45 degrees, and more advantageously in the interval 20 to 40 degrees, e.g. around 30 degrees.

The distal plate part may extend along 5 to 30 degrees of a circumference of the root end flange, advantageously along 10 to 30 degrees of the circumference, more advantageously along 15 to 25 degrees of the circumference, e.g. around 18 degrees (or 1/20 of the entire circumference). Accordingly, it is seen that the plate part only extends along a limited part of the entire root end flange.

In one advantageous embodiment, the distal plate part is arranged with a spacing to a radial inner part of the ring-shaped body. Accordingly, a clearing is provided for the sensor for detecting the position of the plate part, such that the blade itself does not interfere with the sensor.

In another advantageous embodiment, the distal plate part is centered at an offset angle of 20 to 90 degrees from a zero twist angle of the wind turbine blade, advantageously 25 to 60 from the zero twist angle, more advantageously 30 to 45 from the zero twist angle, e.g. approximately 35 degrees from the zero twist angle.

The distal plate part may advantageously be arranged substantial flush with an inboard part of the root end flange. Accordingly, the plate part is arranged near the hub.

The invention also provides a wind turbine blade pitch system comprising a blade according to any of the aforementioned embodiments and a pitch bearing, wherein the distal plate part is utilised as a pitch limiter or a pitch angle indicator. The plate part may for instance be utilised to indicate a zero pitch angle point for continuous calibration of the pitch system.

The invention further provides a wind turbine comprising a rotor including a number of wind turbine blades according to any of the aforementioned embodiments and a hub, from which the blade or blades extend substantially in a radial direction, wherein the wind turbine is provided with a sensor to detect a location of the distal plate part of the root end flange.

Accordingly, the sensor may be utilised to identify the pitch position of the wind turbine blade The wind turbine preferably comprises a substantially horizontal rotor shaft, i.e. the wind turbine being a horizontal axis wind turbine (HAWT). The wind turbine preferably comprises a machine housing on top of a tower and has a rotor with a hub and a number of wind turbine blades, preferably two or three, mounted on a substantially horizontal rotor shaft.

In one advantageous embodiment, the sensor is mounted to a stationary part of the hub.

In a highly advantageous embodiment, the wind turbine comprises at least two sensors arranged so as to be able to detect a direction of pitching. The sensors may for instance be arranged at two different circumferential positions relative to the plate part of the root end flange. Accordingly, the sensors may be arranged such that a first sensor detects the plate part at a first pitch angle and the second sensor detects the plate part at a second pitch angle.

In a first advantageous embodiment, the sensor is a contact sensor, which is adapted to contact the distal plate part of the root end flange.

In a second advantageous embodiment, the sensor is an optical sensor. In a third advantageous embodiment, the sensor is a capacitive sensor. In a fourth advantageous embodiment, the sensor is an inductive sensor.

In principle, it is also possible to provide a pitch limiter or a pitch angle indicator as a separate device that extends from an inner blade wall of the wind turbine instead of the root end flange. The pitch limiter or pitch angle indicator may still advantageously be arranged close to the root end of the flange and may have a form corresponding to any of the aforementioned embodiments.

BRIEF DESCRIPTION OF THE FIGURES

The invention is explained in detail below with reference to embodiments shown in the drawings, in which FIG. 8 shows a second sensor system embodiment for detecting a pitch angle of a wind turbine blade, FIG. 9 shows a third sensor system embodiment for detecting a pitch angle of a wind turbine blade, FIG. 10 shows a fourth sensor system embodiment for detecting a pitch angle of a wind turbine blade, and FIG. 11 shows a fifth sensor system embodiment for detecting a pitch angle of a wind turbine blade.

DETAILED DESCRIPTION OF THE INVENTION

Figure 1:
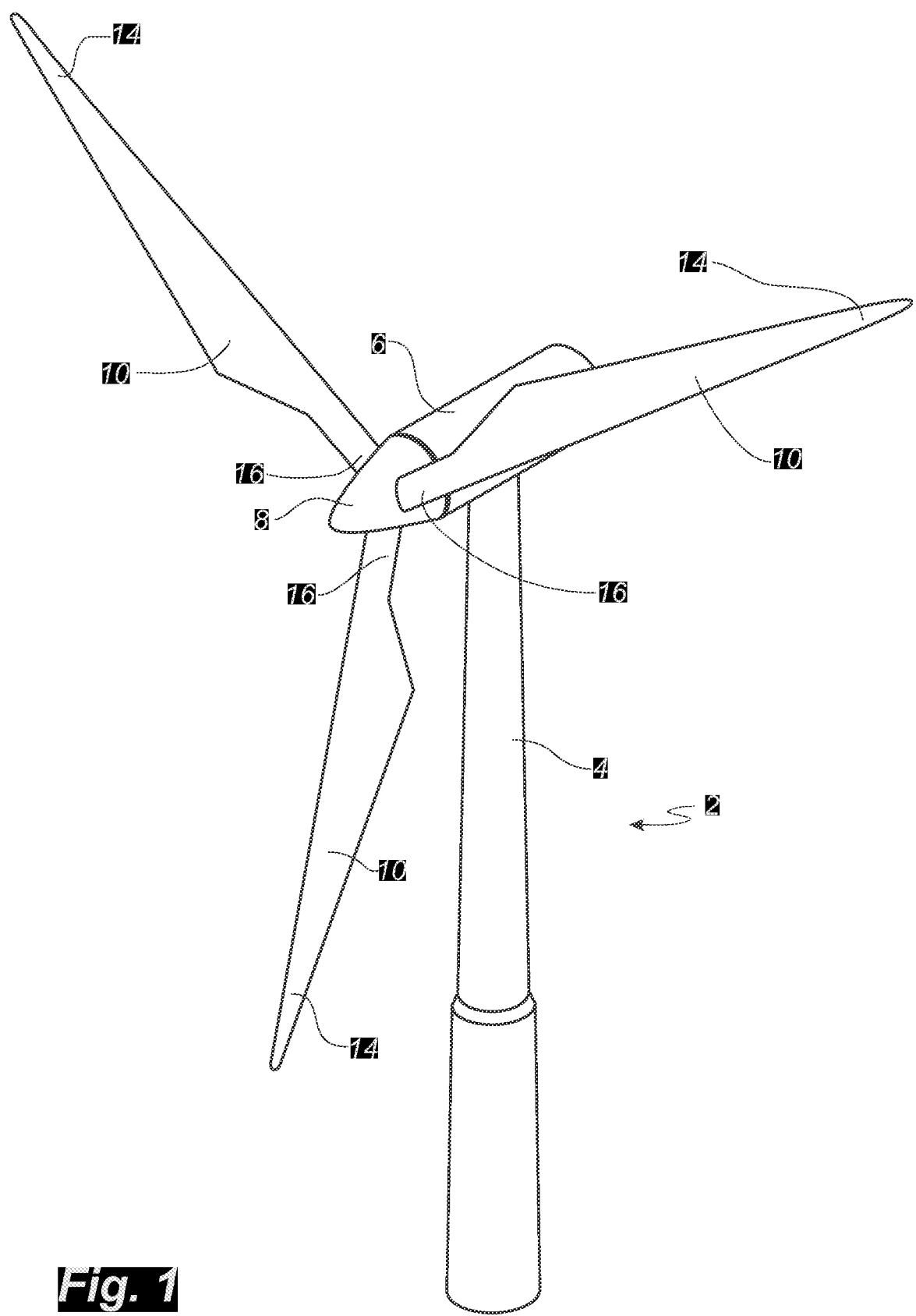
FIG. 1 shows a wind turbine, seen in perspective.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
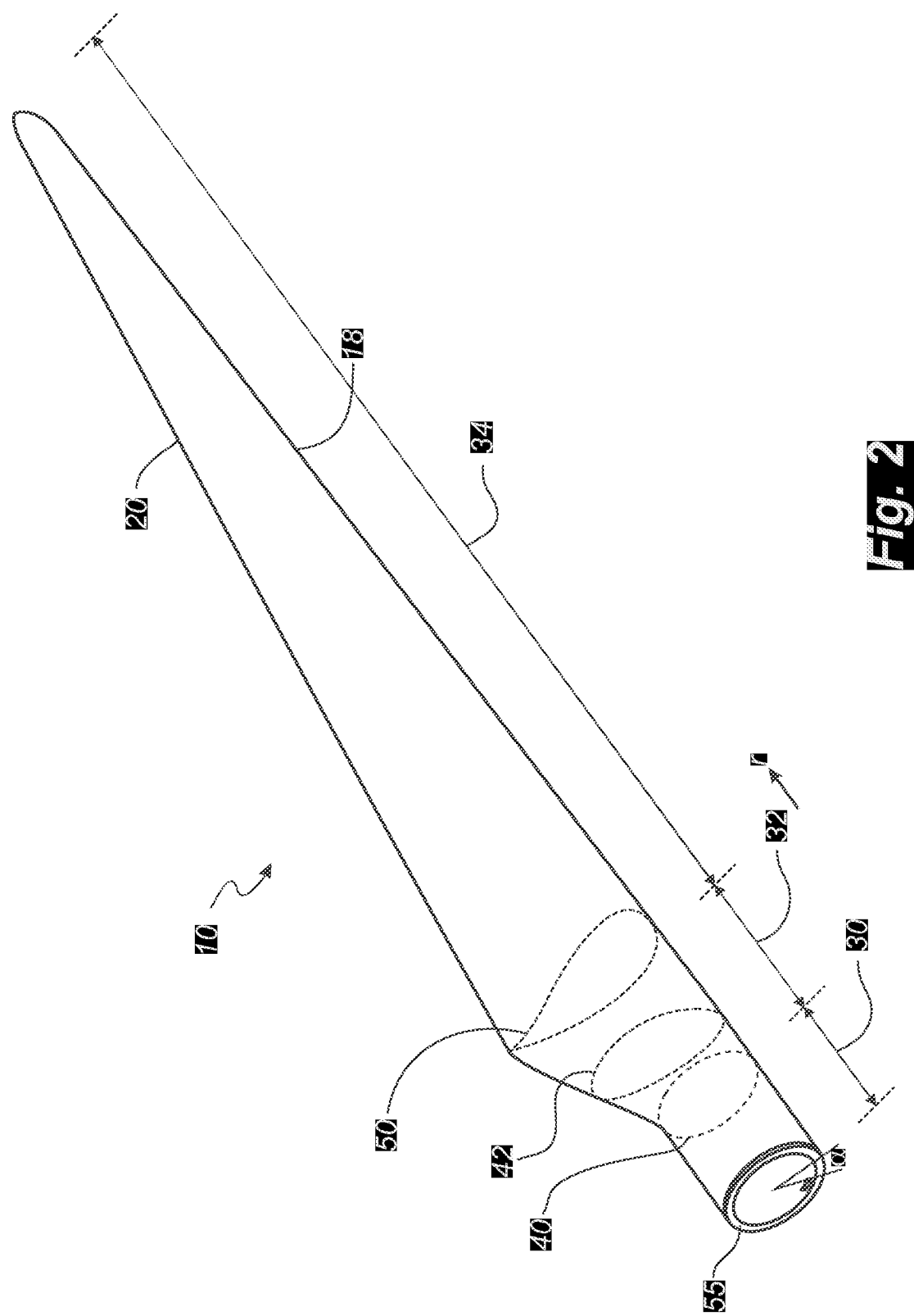
FIG. 2 shows a schematic view of a wind turbine blade according to the invention, seen in perspective.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

The chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell body 45, which is made of a fibre-reinforced polymer material, e.g. a polymer matrix reinforced with glass fibres and/or carbon fibres and is further provided with a root end flange 55 connected to a root end of the wind turbine blade 10. The root end flange 55 is provided with an inwardly extending protrusion 70 having a distal plate part 72. The protrusion 70 and plate 72 may for instance be arranged such that a proximal end of the plate part 72 is arranged at approximately a 35 degree angle compared to a zero pitch angle of the blade.

The shell body 45 is often made of an upwind blade shell part and a downwind blade shell part, which are bonded to each other near the leading edge 18 and the trailing edge 20 of the blade 10. The zero pitch angle of the blade is located close to the bond lines of the shell parts.

Figure 3:
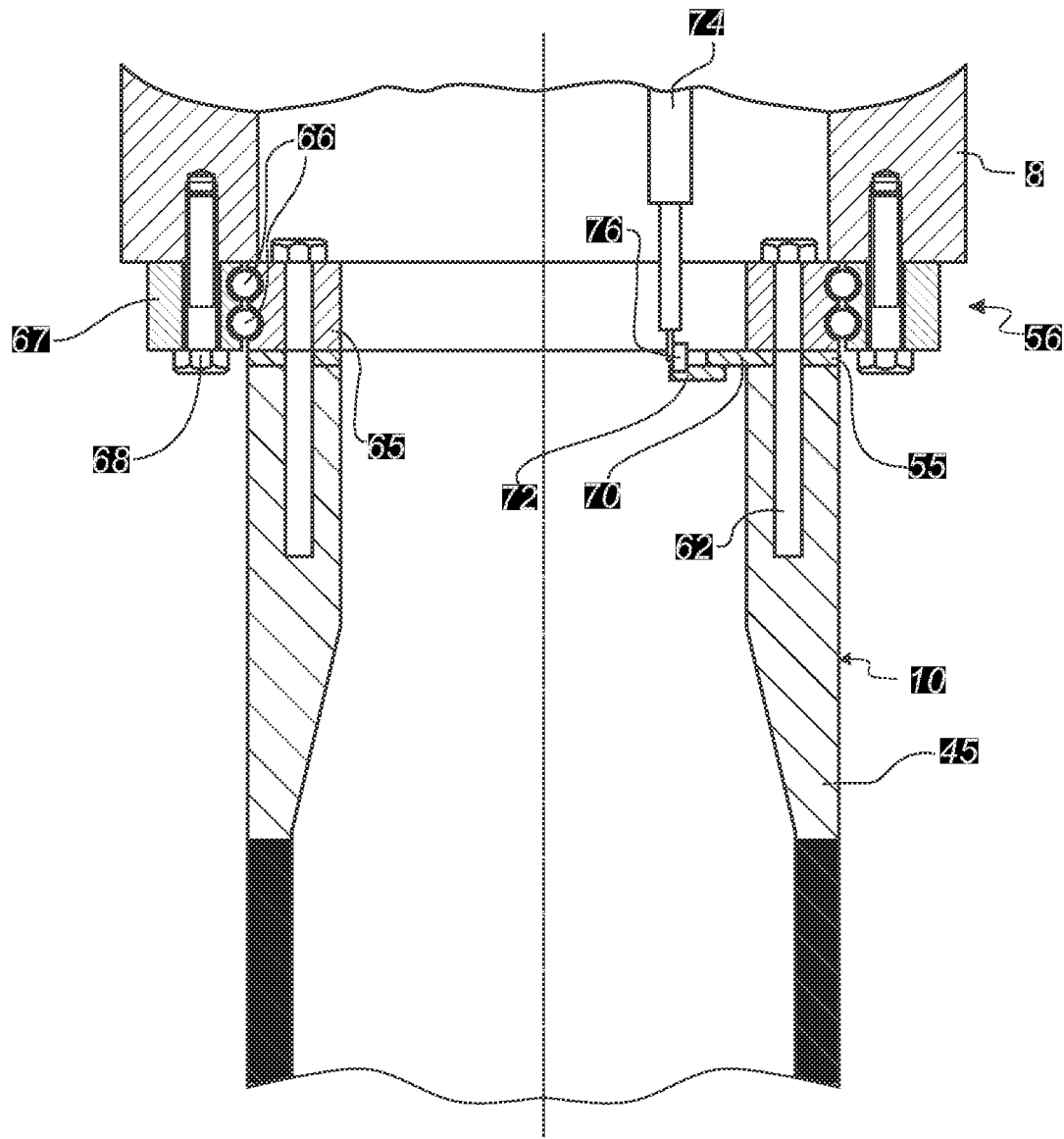
FIG. 3 shows a longitudinal sectional view through a root section of the wind turbine blade according to the invention connected to the hub of the rotor of the wind turbine.

FIG. 3 shows a longitudinal sectional view through a root section of a first embodiment of the wind turbine blade according to the invention connected to the hub 8 of the rotor of the wind turbine 2.

In the embodiment according to the invention shown in FIG. 3, the blade 10 comprises a root end flange 55 forming part of a hub to root connection between the root of the blade and a pitch bearing 56 of the hub. The pitch bearing 56 comprises an outer ring 67 and an inner ring 65. The inner ring 65 is connected to the blade via the root end flange 55 and a plurality of fastening elements 62 for instance in form of a bushing and bolt connection, e.g. with a plurality of bushings embedded in the shell body 45 of the blade and connected to the inner ring 65 of the pitch bearing 56 via a plurality of corresponding stay bolts. The number of bushings and bolts may e.g. be 50-150.

The outer ring 67 of the pitch bearing 56 is stationary mounted to the hub 8 of the wind turbine, which can also be obtained by a plurality of fasteners 68, such as bolts. The inner ring 66 and the outer ring 67 of the pitch bearing 56 may be rotated relative to each other via a plurality of ball bearings 66 such that the blade 10 may be pitched relative to the hub 8.

The bolts and bushings 62 as well as the root end flange 55 and the inner and outer rings 66, 67 of the pitch bearing 56 are preferable made of a metal, such as stainless steel. It is also possible to attach the blades in other ways, e.g. by use of T-bolts and barrel nuts.

As shown in FIG. 3, the pitch bearing 56 is advantageously a ball bearing. The pitch bearing 56 could, however, also be any kind of bearing, including a roller bearing or a combination of a roller bearing and a ball bearing.

According to the invention, the root end flange 55 is provided with an inwardly extending protrusion 70 having a distal plate part 72.

The hub 8 of the wind turbine 2 comprises a pitch sensor 74, which can detect the position of the distal plate part 72. The pitch sensor 74 is stationary mounted to the hub 8 and may be provided with a contact 76, which is adapted to interact with the distal plate part 72 of the root end flange 55, when the blade 10 is pitched to an angle, where the blade sensor 74 and the distal plate part 72 are positioned in the same angular position. Accordingly, the inwardly extending protrusion 70 and the plate part 72 may be used as a pitch limiter or pitch angle indicator.

As previously indicated, the root end flange comprises a ring-shaped body and an inwardly extending protrusion having a connected plate part. The root end flange may further be divided into a number of separate segments.

Figure 4:
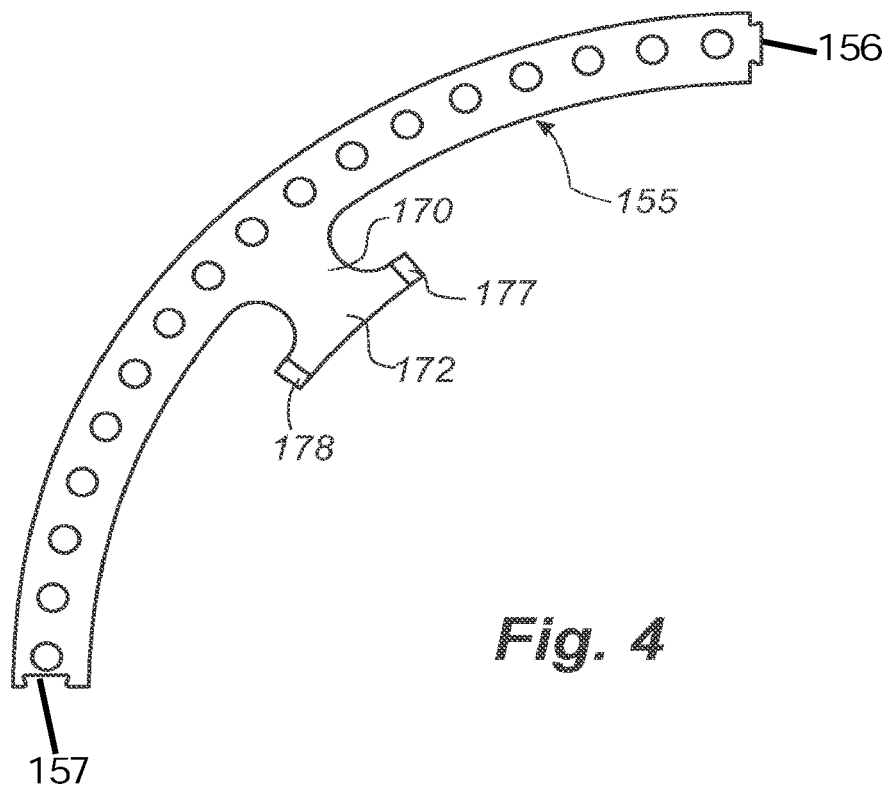
FIG. 4 shows a first embodiment of a root end flange segment according to the invention.

FIG. 4 shows a first embodiment of a root end flange segment 155 according to the invention. The root end flange segment 155 as shown comprises an inwardly extending protrusion 170 having a distal plate part 172. The distal plate part comprises a first taper section 177 at a first circumferential end of the plate part 172 and a second taper section 178 at a second circumferential end of the plate part 172. In the shown embodiment, the ring-shaped part of the root end flange segment 155, the inwardly extending protrusion 170 and the distal plate part 172 are integrally formed as a single unit.

The root end flange segment 155 comprises mating connections 156, 157 at circumferential ends of the ring-shaped part of the root end flange segment 155, thereby being adapted to form a mating connection with one or more additional root end flange segments completing the ring-shaped part of the root end flange. The additional root end flange segments may also be provided with inwardly extending protrusions and distal plate parts. But in general, a single protrusion and plate are sufficient for the invention.

Figure 5:
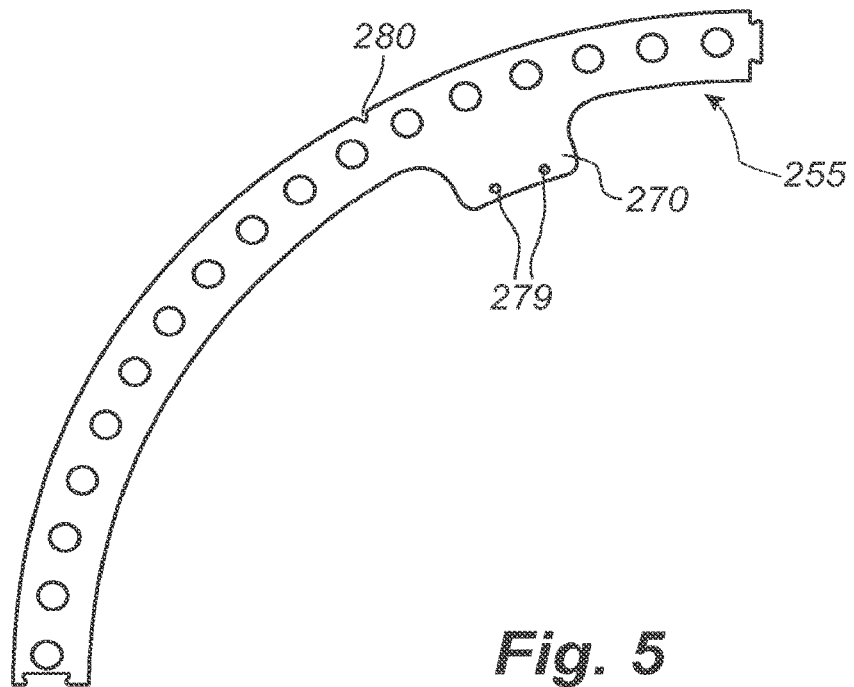
FIG. 5 shows a second embodiment of a root end flange segment according to the invention.

FIG. 5 shows a second embodiment of a root end flange segment 255 according to the invention. The root end flange segment 255 comprises an inwardly extending protrusion 270. Instead of having an integrally formed plate part, the inwardly extending protrusion 270 is provided with mounting holes 279 for connecting a plate part. Further, the root end flange segment 255 is provided with an alignment marker 280, which may be utilised to ensure correct arrangement on the root end of the wind turbine blade compared to for instance a zero-pitch position of the blade. The embodiment shown in FIG. 4 may of course also be provided with such a marker.

Figure 6A:
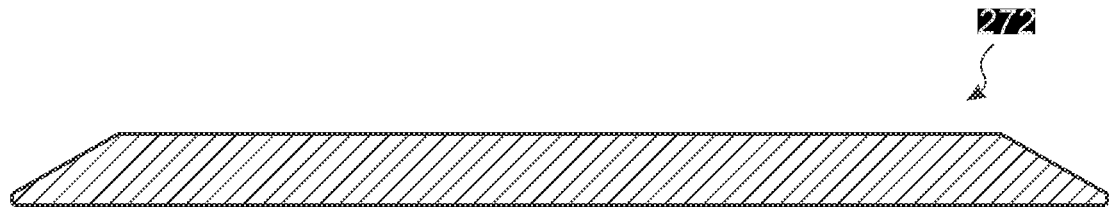
FIGS. 6a-d show further details of the second embodiment of a root end flange segment according to the invention.
Figure 6B:
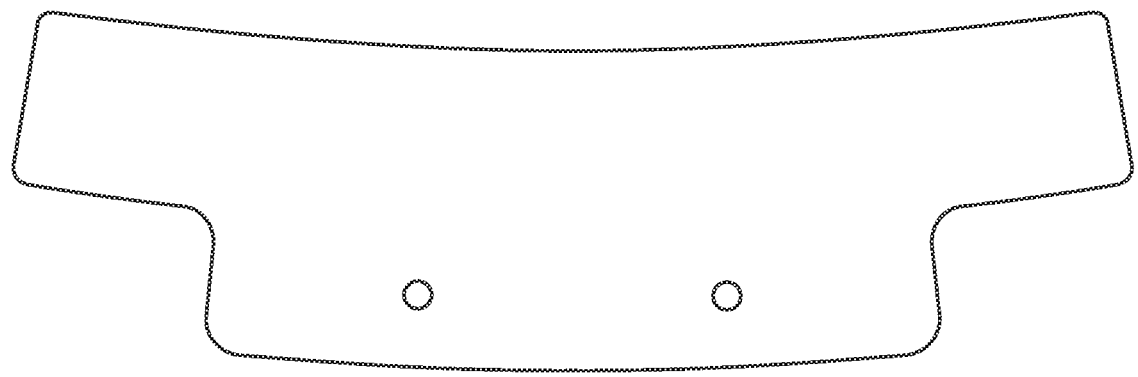
Figure 6C:
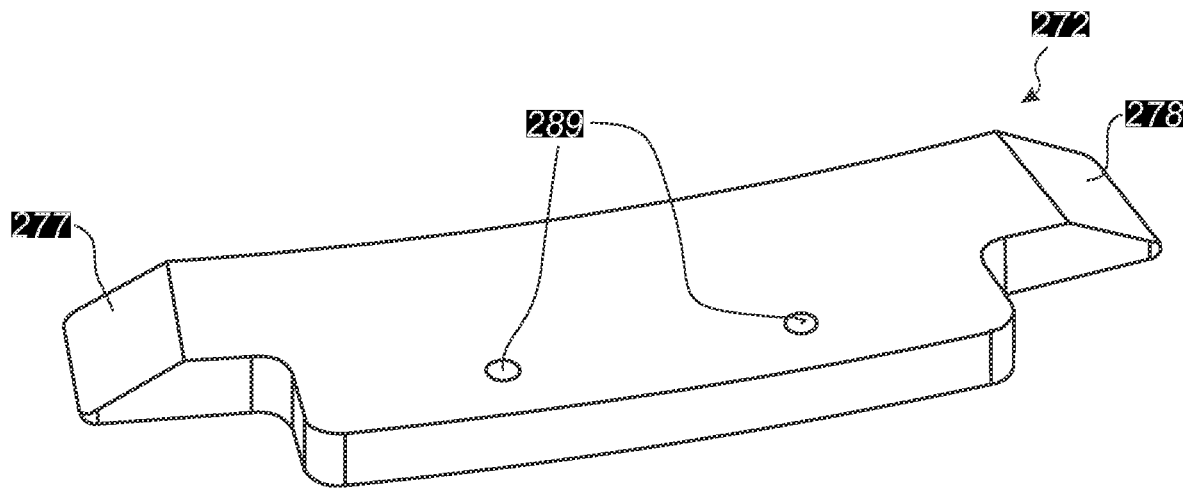

FIGS. 6*a*-*d* show further details of the second embodiment of the root end flange segment 255 according to the invention. FIG. 6*a* shows a cross-sectional view of a plate 272, which is adapted to be connected to the inwardly extending protrusion 270 of the root end flange segment 255. FIG. 6*b* shows a top view of the plate 272 and FIG. 6*c* shows a perspective view of the plate 272. It is seen that the plate 272 is provided with a number of mounting holes 289, such that the plate 272 may be connected to the corresponding mounting holes 279 of the protrusion 270. Further, the plate 272 comprises a first taper section 277 at a first circumferential end of the plate 272 and a second taper section 278 at a second circumferential end of the plate part 272.

Figure 6D:
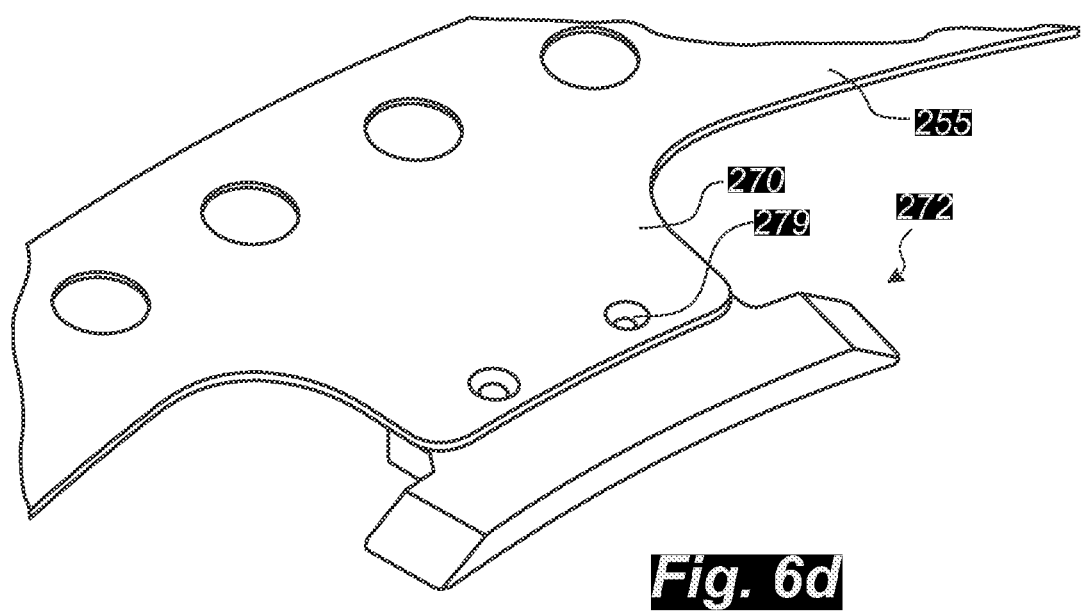

FIG. 6*d* shows a perspective view of the plate 272 mounted to the protrusion 270 of the root end flange segment 255. The plate 272 and the protrusion 270 may advantageously be connected via a number of screws (not shown). As shown, the mounting holes 279 of the protrusion 270 may be provided with a countersink. The mounting holes of the plate 272 may be threaded in order to provide a connection. Alternatively, the hole may be through-going and nuts may be utilised to provide the connection between the plate 272 and the protrusion 270.

In the shown embodiment, the plate 272 and protrusion 270 are each provided with two mounting holes. The two mounting holes may have different diameters, such that it is ensured that the mounting plate 272 may only be arranged in one orientation relative to the protrusion 270.

Figure 7:
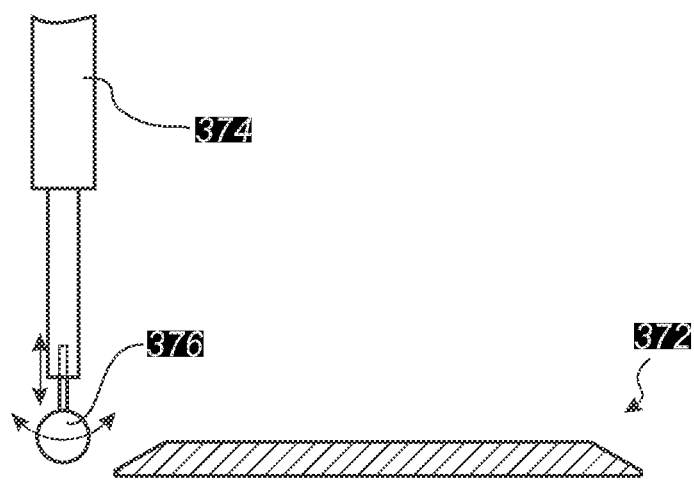
FIG. 7 shows a first sensor system embodiment for detecting a pitch angle of a wind turbine blade.

FIG. 7 shows a first sensor system embodiment for detecting a pitch angle of a wind turbine blade. The sensor system embodiment comprises a plate part 372, which is attached to a root end flange of a pitchable wind turbine blade. The sensor system comprises a sensor 374, which is stationary mounted to the hub of the wind turbine. The sensor 374 is provided with a contact 376, which may be provided in form of a linearly actuated switch or an angular switch. When the blade is pitched, the plate part 372 may thus be brought into contact with the contact 376. If the plate part 372 as depicted is provided with tapered end sections, pitching of the blade will bring the taper section into contact with the contact 376 and thus push the contact 376 towards the hub. Accordingly, the sensor system may be utilised as a pitch limiter for the wind turbine or as a pitch angle indicator, e.g. for continuous calibration of the pitch system of the wind turbine.

FIG. 8 shows a second sensor system embodiment for detecting a pitch angle of a wind turbine blade. The sensor system embodiment comprises a plate part 472, which is attached to a root end flange of a pitchable wind turbine blade. The sensor system comprises a sensor 474, which is stationary mounted to the hub of the wind turbine. The sensor 474 is provided with a first contact 476 and a second contact 476', which may be provided in form of a linearly actuated switch. When the blade is pitched, the plate part 474 may thus be brought into contact with the contacts 476, 476'. If the plate part 472 as depicted is provided with tapered end sections, pitching of the blade will bring the taper section into contact with one of the contacts 476, 476' and thus push the contact 476, 476' towards the hub. Depending on the direction of pitching, either the first contact 476 or the second contact 476' will first come into contact (or out of contact) with the plate part 472. Accordingly, it is seen that the use of two sensor parts or contacts 476, 476' provides a simple solution to also derive the direction of pitching.

Contact or switch solutions as shown in FIGS. 7 and 8 are preferred according to the invention, but in principle, it is also possible to utilise other sensor types as will be shown in the following.

FIG. 9 shows a third sensor system embodiment for detecting a pitch angle of a wind turbine blade, which utilise a capacitive sensor 574. The plate part 572 of the root end flange of the blade may be formed such that the distance between the plate part 572 and the capacitive sensor varies as a function of the pitch angle. Accordingly, the capacitance changes, which in turn can be utilised to determine the pitch angle of the blade.

FIG. 10 shows a fourth sensor system embodiment for detecting a pitch angle of a wind turbine blade, where optical sensing is utilised to determine the pitch angle of the blade. In the shown embodiment, an optical source 674, such as a light emitting diode or a laser diode, is use for the sensor system. In the shown embodiment, the plate part 672 of the root end flange is provided with a number of apertures and a photo sensor array is arranged behind the apertures. Thus, only a limited number of the photo sensors detects the emitted light from the light source 674 depending on the particular blade pitch angle. In the shown embodiment, the photo sensor array is arranged behind apertures in the plate 672. However, in principle, the photo sensor array may also be arranged in front of the plate 672. Further, the setup may be reversed, such that the light source is arranged on the plate part 672 and the photo sensor array is arranged stationary to the hub.

FIG. 11 shows a fifth sensor system embodiment for detecting a pitch angle of a wind turbine blade. In this setup the sensor 774 houses both a light emitter and a receiver, and the sensor system is based on backscattered light from the plate part 772 of the root end flange. The plate 772 may be shaped so as to be able to derive the exact position of the plate 772 relative to the sensor 774 and/or the light source may be modulated.

The invention is not limited to the embodiment described herein, and may be modified or adapted without departing from the scope of the present invention.

LIST OF REFERENCE NUMERALS

| | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 30 | root region |
| 32 | transition region |
| 34 | airfoil region |
| 40 | Circular profile |
| 42 | Transition profile |
| 45 | Shell body |
| 50 | Airfoil profile |
| 55, 155, 255 | Root end flange |
| 56 | Hub to root connection |
| 62 | Fasteners/bushings |
| 65 | Inner ring of pitch bearing |
| 66 | Ball bearings |
| 67 | Outer ring of pitch bearing |
| 68 | Bolts |
| 70, 170, | inwardly extending protrusion |
| 72, 172, 272, 372, 472, 572, 672, 772 | Plate |
| 74, 374, 474, 574, 674, 774 | Pitch sensor |
| 76, 376, 476, 476' | Contact |
| 177, 277 | First taper section |
| 178, 278 | Second taper section |
| 279 | Mounting holes |
| 280 | Alignment marker |
| 289 | Mounting holes |

The invention claimed is:

1. A wind turbine blade (10) for a horizontal axis wind turbine (2), wherein the wind turbine blade (10) extends in a longitudinal direction parallel to a longitudinal axis and having a tip end (14) and a root end (16), and wherein the wind turbine blade (10) further comprises a shell body (45), and wherein the wind turbine blade (10) further comprises a root end flange (55, 155, 255) at the root end (16) of the wind turbine blade (10) and the root end flange comprises a ring-shaped body that extends circumferentially along the entire root end (16), wherein the root end flange (55, 155, 255) comprises an inwardly extending protrusion (70, 170) with a distal plate part (72, 172, 272, 372, 472, 572, 672, 772) arranged at a distance from the ring-shaped body, wherein the distal plate part (72, 172, 272, 372, 472, 572, 672, 772) comprises first and second taper sections positioned directly opposite from one another and extending from a single radial plane of the distal plate part (72, 172, 272, 372, 472, 572, 672, 772), and wherein the root end (16) of the wind turbine blade (10) is configured for attachment to a ring of a pitch bearing, the ring-shaped body of the root end flange (55, 155, 255) being separate and distinct from the pitch bearing.

2. The wind turbine blade according to claim 1, wherein the root end flange (55, 155, 255) is divided into a plurality of connected root end flange segments.

3. The wind turbine blade according to claim 1, wherein the inwardly extending protrusion (70, 170) and the distal plate part (72, 172, 272, 372, 472, 572, 672, 772) are integrally formed.

4. The wind turbine blade according to claim 1, wherein the inwardly extending protrusion (70, 170) and the distal plate part (72, 172, 272, 372, 472, 572, 672, 772) are provided as two or more connected parts.

5. The wind turbine blade according to claim 1, wherein each of the first and second taper sections has a taper angle in the interval from 10 to 60 degrees.

6. The wind turbine blade according to claim 1, wherein the distal plate part (72, 172, 272, 372, 472, 572, 672, 772) extends along 5 to 30 degrees of a circumference of the root end flange.

7. The wind turbine blade according to claim 1, wherein the distal plate part (72, 172, 272, 372, 472, 572, 672, 772) is centered at an offset angle of 20 to 90 degrees from a zero twist angle of the wind turbine blade.

8. The wind turbine blade according to claim 1, wherein the distal plate part (72, 172, 272, 372, 472, 572, 672, 772) is positioned flush against an inboard part of the root end flange (55, 155, 255).

9. A wind turbine blade pitch system comprising a wind turbine blade according to claim 1 and the pitch bearing, wherein the distal plate part (72, 172, 272, 372, 472, 572, 672, 772) is utilized as a pitch limiter or a pitch angle indicator.

10. The wind turbine blade according to claim 2, wherein the plurality of connected root end flange segments are interconnected via a mating connection.

11. The wind turbine blade according to claim 5, wherein the taper angle ranges between 15 and 45 degrees.

12. The wind turbine blade according to claim 6, wherein the distal plate part (72, 172, 272, 372, 472, 572, 672, 772) extends along 10 to 30 degrees of the circumference of the root end flange.

13. The wind turbine blade according to claim 7, wherein the offset angle ranges between 25 and 60 degrees from the zero twist angle.

14. The wind turbine blade according to claim 1, wherein the root end flange (55, 155, 255) comprises metal.

15. The wind turbine blade according to claim 14, wherein the root end flange (55, 155, 255) comprises stainless steel.

16. A wind turbine (2) comprising a rotor including a number of wind turbine blades (10) and a hub (8), from which each of the wind turbine blades blade (10) extends substantially in a radial direction,
wherein each of the wind turbine blades (10) extends in a longitudinal direction parallel to a longitudinal axis and has a tip end (14) and a root end (16), and wherein each of the wind turbine blades (10) further comprises a shell body (45), and wherein each of the wind turbine blades (10) further comprises a root end flange (55, 155, 255) at the root end (16), the root end flange (55, 155, 255) comprising a ring-shaped body that extends circumferentially along the entire root end (16), wherein the root end flange (55, 155, 255) comprises an inwardly extending protrusion (70, 170) with a distal plate part (72, 172, 272, 372, 472, 572, 672, 772) arranged at a distance from the ring-shaped body, and wherein the wind turbine (2) further comprises a sensor to detect a location of the distal plate part (72, 172, 272, 372, 472, 572, 672, 772) of the root end flange (55, 155, 255) of each of the wind turbine blades (10).

17. The wind turbine according to claim 16, wherein the sensor is mounted to a stationary part of the hub (8).

18. The wind turbine according to claim 16, wherein the wind turbine comprises at least one additional sensor, the sensor and the at least one additional sensor being arranged so as to be able to detect a direction of pitching.

19. The wind turbine according to claim 16, wherein the sensor is a contact sensor, which is adapted to contact the distal plate part (72, 172, 272, 372, 472, 572, 672, 772) of the root end flange (55, 155, 255).

* * * * *